No. 767,203. PATENTED AUG. 9, 1904.
W. H. BURNETT.
NUT LOCK.
APPLICATION FILED JAN. 12, 1904.
NO MODEL.
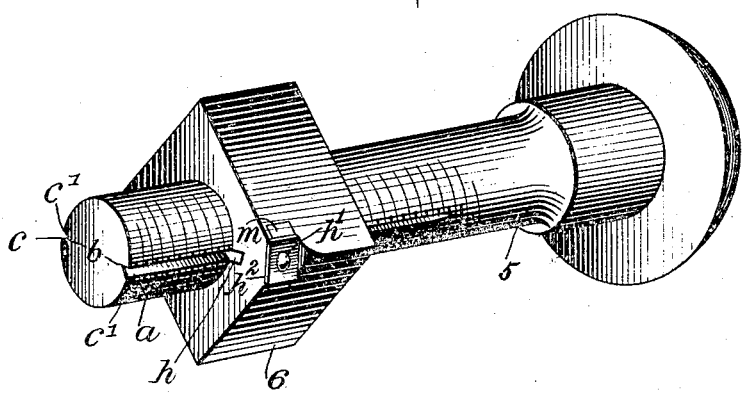
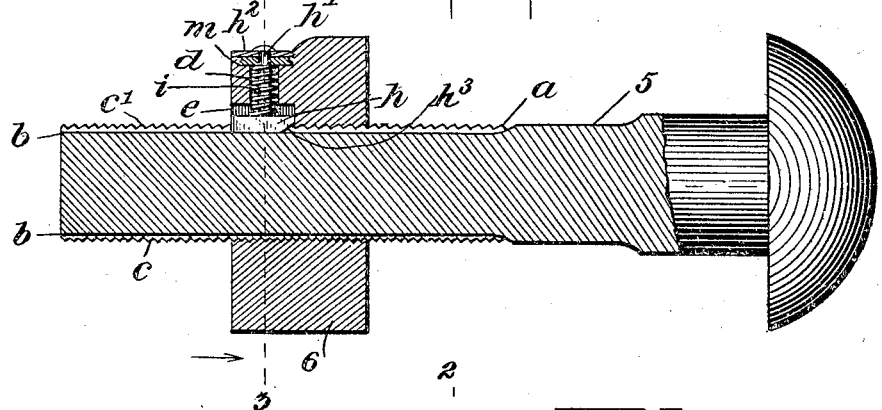
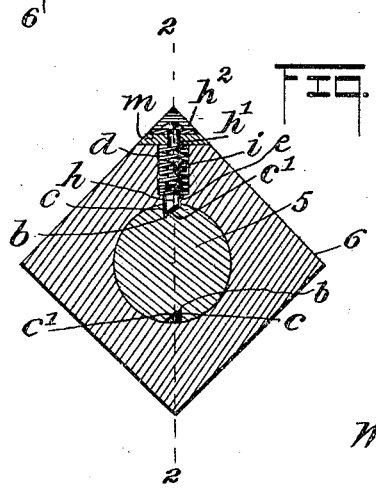
WITNESSES:
INVENTOR
William H. Burnett
BY
ATTORNEYS No. 767,203.

Patented August 9, 1904.

UNITED STATES PATENT OFFICE.

WILLIAM H. BURNETT, OF SPRINGFIELD, ILLINOIS, ASSIGNOR OF ONE-HALF TO LEROY R. LAWSON AND JOSEPH H. BASSETT, OF SPRINGFIELD, ILLINOIS, AND BENJAMIN M. BROCCHUS, OF FORT SMITH, ARKANSAS.

NUT-LOCK.

SPECIFICATION forming part of Letters Patent No. 767,203, dated August 9, 1904.

Application filed January 12, 1904. Serial No. 188,773. (No model.)

*To all whom it may concern:*

Be it known that I, WILLIAM H. BURNETT, a citizen of the United States, and a resident of Springfield, in the county of Sangamon and State of Illinois, have invented a new and Improved Nut-Lock, of which the following is a full, clear, and exact description.

This invention relates to nut-locks of a class in which the nut is held in locked condition on the thread of the bolt by means carried by the nut and adapted for interlocking engagement with a groove in the bolt, and has for its object to provide novel details of construction for a nut-lock of the class indicated which adapt it for convenient adjustment either to lock the nut at a desired point on the threaded body of the bolt or release the nut to permit its removal from the bolt without injury to the nut, the bolt, or the locking device.

The invention consists in the novel construction and combination of parts, as is hereinafter described, and defined in the appended claim.

Reference is to be had to the accompanying drawings, forming a part of this specification, in which similar characters of reference indicate corresponding parts in all the figures.

Figure 1 is a perspective view of a bolt and a nut thereon held from reversed turning movement by the improved nut-lock. Fig. 2 is a longitudinal sectional view of the bolt and nut, showing the improved nut-lock on the nut and engaging the bolt, the section being substantially on the line 2 2 in Fig. 3; and Fig. 3 is a transverse sectional view of the bolt and nut, exposing the improved nut-lock, the section being substantially on the line 3 3 in Fig. 2.

The bolt 5 is shown to illustrate the improved means for holding a nut 6 from retraction on the bolt, may be of any dimensions, and the thread $a$ thereon may be of coarse or fine pitch, as may be preferred. Any suitable number of grooves $b$ are formed in the threaded portion of the bolt-body 5, two of such grooves being shown opposite each other and each extending longitudinally in the form of an angular channel of suitable depth, said grooves or channels respectively having an upright side wall $c$ and a laterally-inclined side wall $c'$.

A portion of one corner of the nut 6, which is represented as square in contour, is removed, so as to produce a flat place thereon, and centrally in said flattened formation a circular chamber $d$ of a proper depth is formed, which at its base intersects a channel $e$, extending from the end wall of the nut adjacent to the flattened surface of the corner of the same toward the other end of said nut and cuts away the thread in the nut, the width of the channel being preferably equal to that of each angular groove $b$ where the groove and channel meet, as indicated in Fig. 3.

In the chamber $d$ and transverse channel $e$ the body of a locking-dog is placed, said dog consisting of a latch-head $h$, which loosely occupies a portion of the channel $e$, and a shank $h'$, that projects vertically from the latch-head and centrally within the chamber. The lower edge portion of the latch-head $h$ is in the form of a ratchet-tooth and fits loosely in either groove $b$, opposite which it may be positioned, there being a straight wall at the proper side of the latch-head to have contact with the upright side $c$ of a groove in which it is seated and a sloped surface which corresponds with the inclined surface $c'$, so that the latch-head may be seated at any point along either groove $b$ and have interlocked engagement with the bolt-body. The inner lower corner of the latch-head $h$ is reduced, so as to form a slope $h^3$, that will permit the nut to be screwed upon the bolt-thread, which will raise the dog when the nut is rotated for screwing it upon the bolt.

A spiral spring $i$, that encircles the shank $h$, occupies the chamber $d$ and seats upon the latch-head $h$.

In a flat-bottomed recess formed in the flat surface at the corner of the nut having the chamber $d$ therein and that has opposite undercut sides a cap-plate $m$, having correspondingly-beveled side edges, is closely fitted and secured, preferably by riveting over the ends thereof, and in the cap-plate a perforation is formed, through which loosely projects the upper end portion of the shank $h'$.

Upon the projecting end of the shank $h'$ a flat head-plate $h^2$ is secured by riveting the latter over upon the upper edge of the perforation in the head-plate, through which the end of the shank has been upwardly inserted, as is clearly shown in Figs. 2 and 3. The provision of the cap-plate $m$ and head-plate $h^2$ serves to secure the locking-dog in the nut free to reciprocate a limited distance therein, the latch-head $h$, owing to the length of the shank and pressure of the spring $i$, projecting into the threaded bore of the nut 6 when the latter is not in place on the bolt-body.

In use, the bolt 5 being placed in position for service to secure parts of machinery or of a railroad-track together by the employment of the nut 6 as a coöperating means, the nut is mounted upon the bolt and the latch-head $h$ permitted to rest on the threads $a$ of the bolt. It will be seen that the sloped or inclined side $c'$ of each groove in the bolt-body is so arranged with regard to the right-hand turns of the thread that the nut 6 may be freely screwed upon the bolt, so as to bear against the object it is to clamp, as the latch-dog head $h$ will yield, but under pressure of the spring $i$ will become seated in each groove $b$ it crosses, and to lock the nut should be permitted to have such an engagement with a groove when the nut is fully drawn up against the material it is to hold in place.

The ratchet-tooth form given to the edge of the latch-head $h$ adapts the upright wall of the latch-head to have contact with the similar wall $c$ of the engaged groove $b$, which will prevent a release of the dog and insure the nut remaining in locked condition on the bolt until it is released by lifting the dog away from the groove and holding it thus retracted by an engagement of any suitable wedge or the like with the cap-plate $h^2$.

It will be noticed that by placing the latch-dog in a chamber at a corner of the nut more room is available than in a side of the nut and the nut is not weakened by the formation of the chamber. It will also be evident that there are no projections from the nut that will obstruct the use of a wrench for screwing the nut to tighten or release it.

Having described my invention, I claim as new and desire to secure by Letters Patent—

The combination with a threaded bolt, having a plurality of spaced grooves therein, each groove being formed with a vertical side, and an inclined side that trends in direction of the turns of the bolt-thread, of a rectangular nut adapted to screw upon the bolt, said nut being flattened at one corner near an end wall of the nut and formed with a chamber in said corner, intersecting a longitudinal channel that cuts through the thread in the nut, a latch-head having its lower end ratchet-tooth shaped and adapted to fit into either groove in the bolt, said head fitting loosely in the channel, a shank projecting from the latch-head into and through the chamber, a coiled spring in the chamber, encircling the shank and seating upon the latch-head, a dovetailed cap-plate closing the upper end of the chamber and through which the shank passes, and a plate-like head secured upon the upper end of the shank.

In testimony whereof I have signed my name to this specification in the presence of two subscribing witnesses.

WILLIAM H. BURNETT.

Witnesses:
 N. DuBois,
 L. R. Lawson.